(12) United States Patent
Ozturk et al.

(10) Patent No.: US 8,743,494 B2
(45) Date of Patent: Jun. 3, 2014

(54) EXTENDED ADDRESS MARK

(75) Inventors: Mustafa Can Ozturk, Eden Prairie, MN (US); Puskal Prassad Pokharel, Edina, MN (US); Barmeshwar Vikramaditya, Eden Prairie, MN (US)

(73) Assignee: Seagate Technology LLC, Cupertino, CA (US)

(*) Notice: Subject to any disclaimer, the term of this patent is extended or adjusted under 35 U.S.C. 154(b) by 148 days.

(21) Appl. No.: 13/330,144

(22) Filed: Dec. 19, 2011

(65) Prior Publication Data
US 2013/0155539 A1    Jun. 20, 2013

(51) Int. Cl.
*G11B 5/09* (2006.01)
(52) U.S. Cl.
USPC ........... 360/49; 360/53; 360/72.2; 360/77.08; 360/78.14
(58) Field of Classification Search
None
See application file for complete search history.

(56) References Cited

U.S. PATENT DOCUMENTS

| | | | |
|---|---|---|---|
| 5,544,135 A | 8/1996 | Akin, Jr. et al. | |
| 5,706,265 A | 1/1998 | Bang | |
| 5,825,568 A | 10/1998 | Lee | |
| 5,963,387 A | 10/1999 | Son | |
| 6,021,012 A | 2/2000 | Bang | |
| 7,092,462 B2 | 8/2006 | Annampedu et al. | |
| 2008/0180825 A1 | 7/2008 | Erden et al. | |
| 2010/0128386 A1 | 5/2010 | Keizer et al. | |
| 2010/0302676 A1 | 12/2010 | Ozturk et al. | |
| 2012/0033323 A1* | 2/2012 | Mathew et al. | 360/75 |

OTHER PUBLICATIONS

Khambampati et al., "Compensation for Servo Track Writing Error in High Track Density Disk Drives", ITC-CSCC 2006, vol. III, pp. III-373-376, Chiang Mai, Thailand, 2006, 7.10-13.

* cited by examiner

*Primary Examiner* — Wayne Young
*Assistant Examiner* — Brian Butcher
(74) *Attorney, Agent, or Firm* — Braden Katterheinrich

(57) ABSTRACT

An extended servo mark word is used when an error is detected from a servo mark. For example, a servo mark associated with a disk drive track may be detected during a data access operation. In response to an error in detecting the servo mark, at least one adjacent bit is evaluated together with the servo address mark to overcome the error.

18 Claims, 4 Drawing Sheets

EXTENDED ADDRESS MARK

BACKGROUND

The present disclosure relates generally to servo sector data used on devices such as hard disk drives (HDDs). The term "servo sector" (sometimes also referred to as "embedded servo sectors") describes a pattern of data that is encoded on a device once (e.g., during manufacture) and not re-written thereafter. Servo sectors are relatively small patterns of data arranged at regular intervals along each hard drive tracks comprising variously a preamble field, a digital sync pattern (Servo Address Mark or SAM), digital information for sector and track identification data and analog position burst fields. These tracks are generally configured as concentric circles on magnetic disk(s) of the HDD. While performing tracking and/or data transfer operations, a read/write head detects the servo sectors. A servo demodulator processes the servo sectors, including position burst patterns and sends this information to the servo controller to determine where the read/write head is currently located (e.g., zone, track, data sector) on the disk.

The writing of the servo sectors can be performed under controlled conditions, e.g., during manufacturing. Nonetheless, factors such as component wear, thermal cycling, disk slip, etc., are known to cause errors in the reading of servo sector data during the life of the drive. The controller may have some provisions for dealing with servo sector errors as part of normal operation. However, if there are large number of such errors, it would impact performance, e.g., increasing seek times and data recovery. This may be of greater concern as areal data densities continue to increase. When areal density increases, the servo sectors may be written in smaller areas, which may also result in an increase in servo sector read errors.

SUMMARY

Various embodiments described herein are generally directed to methods, systems, and apparatus utilizing a conditional extended servo address mark detection. In various embodiments, a method and logic circuit use an extended servo mark word when an error is detected from a servo mark. In another embodiment, a method involves detecting a servo mark associated with a disk drive track during a data access operation. In response to an error in detecting the servo mark, at least one adjacent bit is evaluated together with the servo mark to overcome the error.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates to managing errors detected when reading hard drive servo sector data. Generally, a hard drive uses pre-formatted servo sectors to enable a servo control system to determine precisely where on a disk a read/write head is located. One part of the servo sector, the servo address mark (SAM) is a predefined pattern that, when detected, allows the servo controller (or similar circuitry) to detect the servo sector itself, so that subsequent data encoded in the servo sector can be reliably read for purposes described above. While the embodiments below describe methods, system, and apparatuses related to SAM errors, SAM detection, etc., these embodiments are equally applicable to analogous data structures, such as sector index marks (SIM), etc. These analogous data structures may be referred to herein as "servo marks."

Figure 1A:
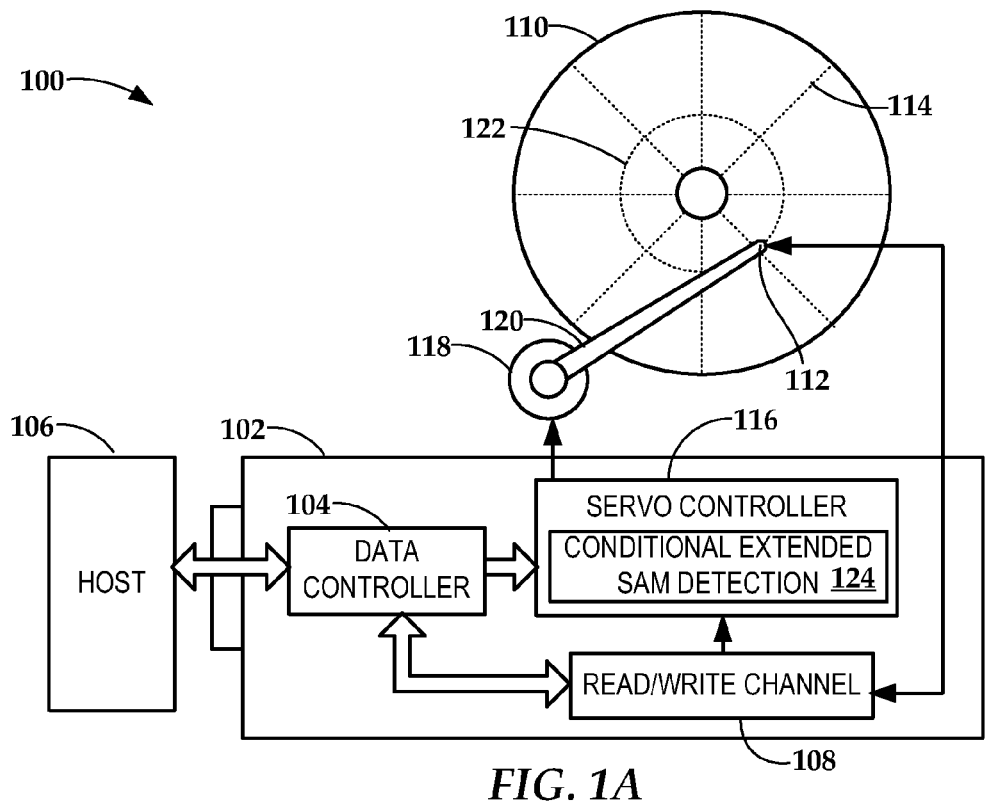
FIG. 1A is a block diagram of a disc drive apparatus according to an example embodiment.

In reference now to FIG. 1, a block diagram illustrates an example of an HDD control logic circuit 102 of an apparatus 100 according to an example embodiment. The circuitry 102 includes a data controller 104 that buffers write commands and associated data from a host device 106. The host device 106 may include any electronic device that can be communicatively coupled to store and retrieve data from an HDD, e.g., a computer. The data controller 104 carries out buffered write commands by formatting the associated data into blocks with the appropriate header information, and transfers the formatted data via a read/write channel 108 to logical block addresses (LBAs) on a data storage surface of a disk 110 identified by the associated write command. The data controller 104 provides analogous functions for read commands, e.g., determining an LBA of desired data, reading the data from the disk 110 via the read/write channel, formatting the data for the host 106, etc.

The read/write channel 108 can convert data between the digital signals processed by the data controller 104 and the analog signals conducted through read/write heads 112. The read/write channel 108 also provides servo data read from servo sectors 114 on the disk 110 to a servo controller 116. The servo controller 116 uses these signals to drive an actuator 118 (e.g., voice coil motor, or VCM) that rotates an arm 120 upon which the read/write heads 112 are mounted. Data within the servo sectors 114 can be used to detect the location of a head 112 relative to LBAs on the disk 110. The servo controller 116 can use LBAs from the data controller 104 and the servo data to move a head 112 to an addressed track 122 and block on the disk 110 (seek mode). While data is being written to and/or read from the disk 110, the servo data is also used to maintain the head 112 aligned with the track 122 (track following mode).

Although two separate controllers 104 and 116 and a read write channel 108 have been shown for purposes of illustration, it is to be understood that their functionality described herein may be integrated within a common integrated circuit package or distributed among more than one integrated circuit package. Similarly, a head disk assembly can include a plurality of data storage disks 110, an actuator arm 120 with a plurality of read/write heads 112 (or other sensors) which are moved radially across different data storage surfaces of the disk(s) 110 by the actuator motor 118 (e.g., voice coil motor), and a spindle motor (not shown) which rotates the disk(s) 110.

Figure 1B:
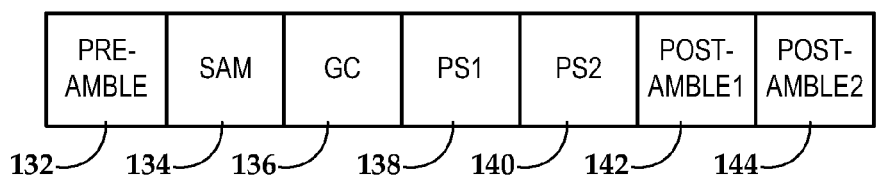
FIG. 1B is a block diagram of a servo sector pattern according to an example embodiment.

As will be discussed in greater detail below, the circuitry 102 may include a module 124 that assists in detecting servo marks within digital patterns that are encoded within servo sectors 114. In FIG. 1B, a block diagram illustrates an example of at least a part of a servo pattern 130 in accordance with an example embodiment. The pattern 130 may reside in one or more of the servo sectors 114 and which may be read therefrom by the head 112 for use by the servo controller 116 to position the head 112 during track following and/or seeking operations. The servo pattern 130 can include a preamble pattern 132, a servo address Mark (SAM) pattern 134, a Gray code (GC) pattern 136, a first position pattern 138, a second position pattern 140, a first postamble pattern 142, and a second postamble pattern 144.

As the head 112 moves through the servo pattern 130 (e.g., reading from left to right), a timing circuit uses a preamble signal to acquire phase and frequency of the preamble signal 132. After acquiring the preamble signal, the circuit may use an analog to digital converter (ADC) to detect patterns corresponding to the other symbols, including SAM 134, GC 136, position burst patterns 138, 140, and postamble patterns 142, 144. In some cases, the position burst patterns 138, 140 may be the only symbols that vary between different servo sectors 114

The present disclosure relates to the detection of the SAM 134 portion of the servo sector data 130. Because the bits of the SAM 134 are known beforehand, a signal processor can determine, following the detection of the preamble 132, whether or not there is a SAM error by comparing a number of bits obtained via the ADC to this known pattern. If at least one bit is incorrect (e.g., due to poor bit quality, channel noise, timing errors, etc.) then a SAM error may be declared. If so, the controller may choose to try other nearby servo sectors 114 until one of them is read without SAM errors (or errors in critical parts of the servo sector data 130).

An alternate to discarding sector data in response to a SAM error is to allow one or more bit errors when reading the SAM. This will generally increase the SAM detection rate, but also increases the likelihood of detecting SAM in the wrong place (false alarms), which may ultimately result in other errors while reading a servo sector 114. A favorable trade-off can be obtained by increasing the number of SAM bits while allowing some bit errors during detection. This can be done by increasing the length of the SAM portion 134, although this may ultimately require more storage area for the servo sectors 114, potentially reducing format efficiency.

Figure 2A:
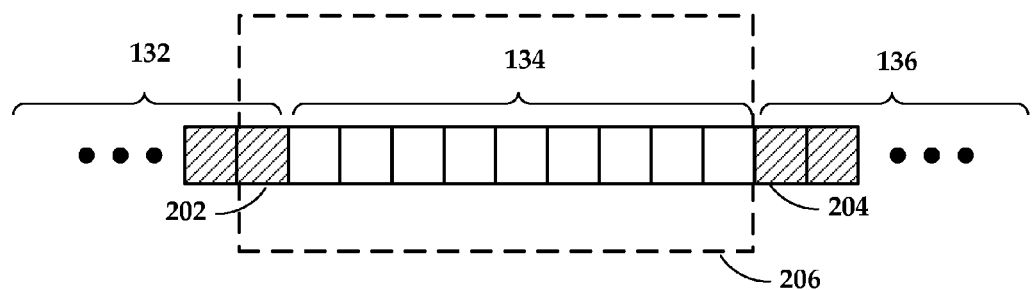
FIGS. 2A-2C are block diagrams of example extended servo mark words according to example embodiments.

Another way of increasing bits used in detecting SAM is to include some preamble bits together with SAM as one longer combined word, and allowing some erroneous bits in this combined word. An example of this is shown in FIG. 2A, which illustrates a more detailed view of the preamble 132, SAM 134, and GC 136 seen in FIG. 1B. For purposes of illustration, this example SAM 134 is nine bits long, although this bit length is not intended to be limiting.

The SAM 134 is directly adjacent bit 202 of the preamble 132 and bit 204 of the GC 136. As indicated by box 206, by including at least the one bit 202 of the preamble 132, a longer pattern (e.g., extended SAM word) can be formed without increasing the length of SAM 134. As seen by alternate extended SAM words 208, 210 in FIGS. 2B and 2C, portions of the GC 136 can be used instead of or in addition to portions of the preamble 132. It will be appreciated that these extended SAM words 206, 208, 210 can include more than one adjacent (or non-adjacent) bit of the preamble 132 and/or GC 136. These extended SAM words 206, 208, 210 may be usable to positively identify the SAM 134 in spite of a threshold number of erroneous bits (e.g., single bit error).

While using an extended SAM word may increase fault tolerance to errors in the SAM 134 itself, erroneous bits in the preamble 132 and/or GC 136 may cause a SAM detection error, even if all bits in the SAM 134 are correct. In recognition of this, a system according to embodiments described herein may selectably use an extended SAM word to balance positive SAM detection vs. false alarm rate. For example, the system may include the preamble bits only if there is a bit error in SAM. When SAM is found without any bit errors, the conventional SAM detection method may be used, e.g., proceed to process remaining data of the servo sectors 114 upon detecting SAM 134 without errors.

Figure 2B:
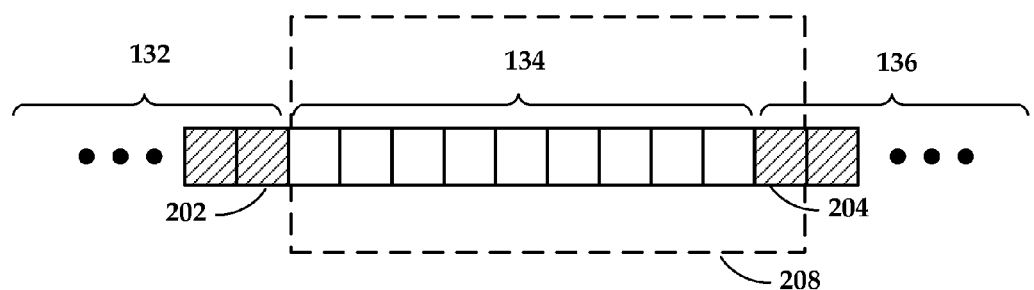
Figure 2C:
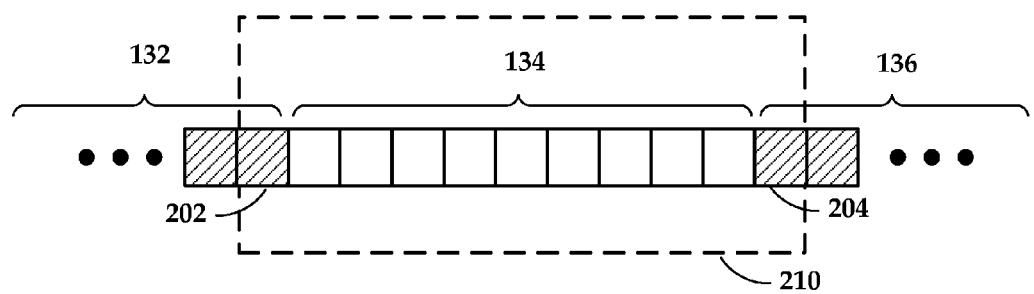

As seen in FIGS. 2A-2C, extended servo mark words (e.g., extended SAM words) 206 and 210 include one or more adjacent bits of the preamble 132, e.g., bit 202. Similarly, extended SAM words 208, 210 include one or more significant bits (MSB) of GC 136, e.g., bit 204. The adjacent bits 202 of the preamble 132 may be constant over the entire disk 110, although it is possible the MSB 204 of the GC 136 may change, e.g., once in the stroke near transition regions. Nonetheless, the expected value of the MSB 204 may be predictable enough that an algorithm could make selective use of this data 204 when needed and known.

Figure 3:
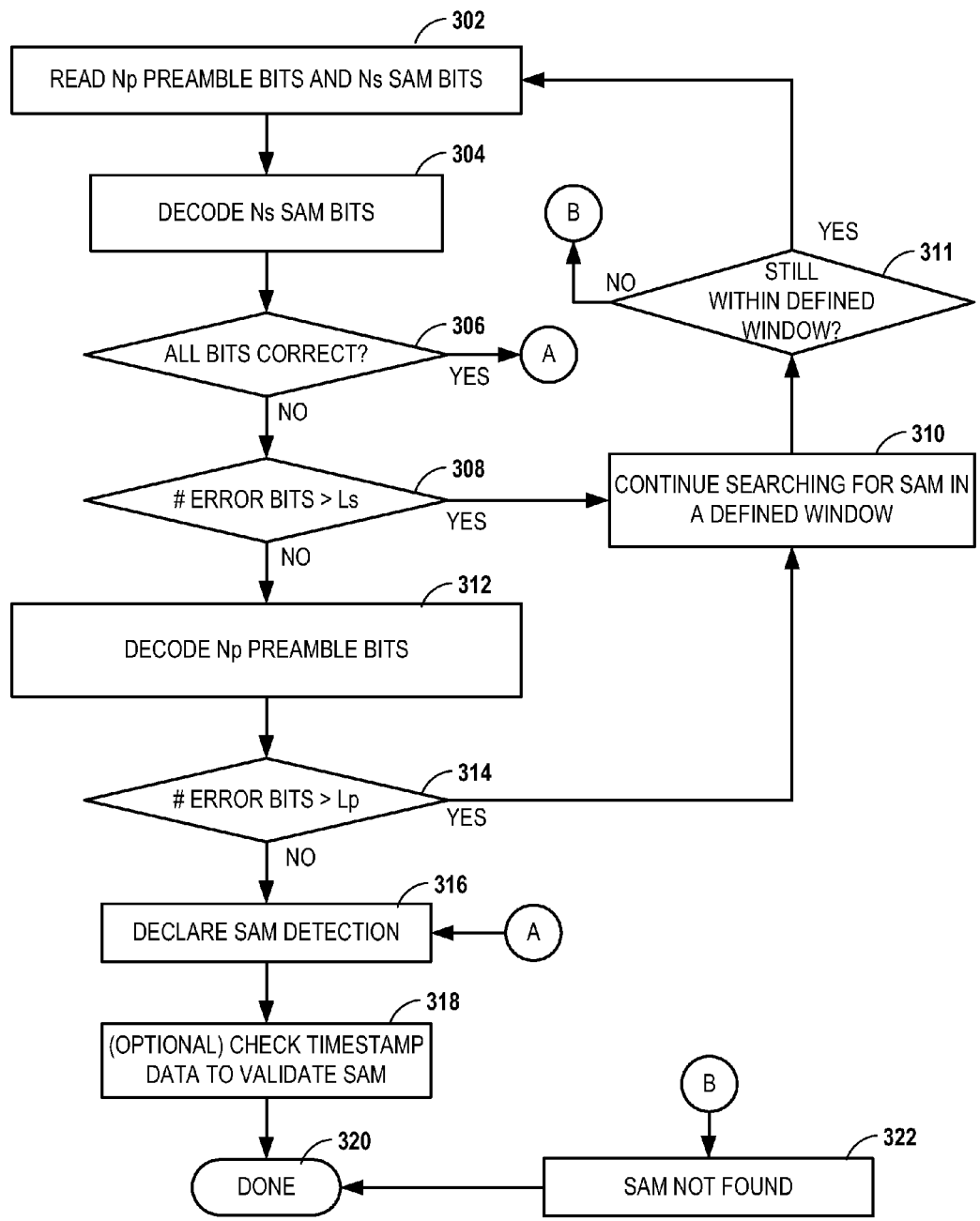
FIG. 3 is a flowchart showing an example conditional servo address mark identification according to example embodiments.

In reference now to FIG. 3, a flowchart illustrates a SAM error detection procedure according to an example embodiment. In this flowchart, the parameters Np, Ns, Ls, and Lp are referred to, and can be chosen based on the desired performance. The Ns parameter refers to the number of bits in the standard (e.g., non-extended) SAM 134, such as nine bits in the examples of FIGS. 2A-2C. The parameter Np refers to a number of preamble bits adjacent to the SAM that may be considered along with the SAM 134. The Ls and Lp parameters refer to a threshold number of bits in the SAM 134 and one or more preamble bits 202 that are allowed to exhibit errors while during SAM detection.

In step 302, Np preamble bits and Ns SAM bits are read in (e.g., sampled). One or more MSB of the GC may also optionally be read in at step 302, which may provide some security against detecting SAM inside the preamble pattern (e.g., false detection). The Ns SAM bits are first decoded at step 304, and if it is determined at step 306 that the bits are correct (e.g., correspond to predetermined pattern), SAM detection is declared at step 316, and a time stamp validation procedure at step 318 (discussed in greater detail below) may optionally be performed. Thus, if the SAM is found without error at step 306, no other bits (e.g., preamble, Gray code) need be read to declare SAM at 316.

If the determination at step 306 results in a bit error, another determination at step 308 is made to see if the number of erroneous bits exceeds Ls. If so, another window of channel data may be selected for continued searching at step 310 for SAM, assuming at step 311 that the algorithm is still within the defined detection window. If not, then a SAM not found is declared at step 322 and the routine terminates for this sector. If it is determined at step 308 that the number of erroneous bits does not exceed Ls, then the Np preamble bits are decoded at step 312. One or more MSB of the GC may also be decoded at this block at step 312. These bits are combined with the SAM to form an extended SAM word, e.g., performing an extended SAM detection conditional on the results of determinations at step 306 and/or at step 308.

In response to the decoding at step 312, a determination at step 314 is made as to whether the number of error bits in the preamble exceeds Lp. If so, searching at step 310 for SAM may continue using a defined window. If it is determined at step 308 that the number of erroneous bits does not exceed Lp, SAM detection is declared at step 316 after steps 312 and 314, and time stamp validation at step 318 may be performed. Assuming validation at step 318 is used and is successful, the procedure may complete at step 320, and further operations triggered by SAM detection at step 316 can be performed.

The timestamp validation at step 318 in FIG. 3 is an optional procedure that can help prevent false alarms, e.g., detecting SAM 134 in a location where the pattern was not intentionally recorded. As mentioned above, the servo sectors 114 in which the SAM 134 is encoded are spaced regularly around adjacent tracks. In some drives, this spacing may be the same from the inner to outer diameter of the disk 110. However, some drives divide the disk 110 into zones, each zone having a different number/spacing of servo sectors 114. Nonetheless, within a particular zone, the servo patterns corresponding to the servo sectors 114 can be expected to be detected at a fixed time intervals, with some variance due to factors such as spindle motor jitter, disk runout, etc. As a result, a timestamp can be maintained between successive SAM detection events, and if SAM detection occurs outside an expected time period, this can be used as evidence of false SAM detection.

Figure 4:
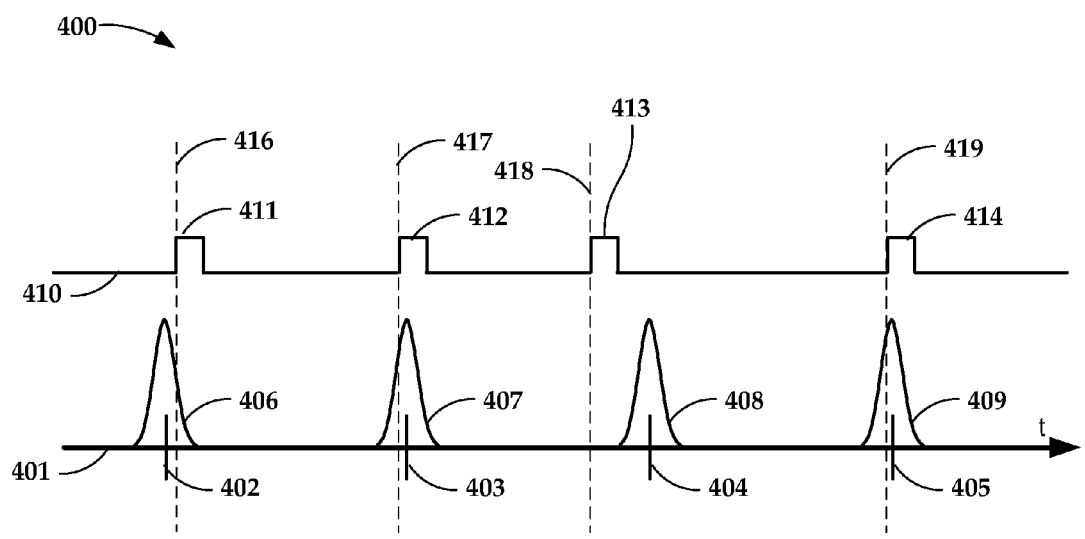
FIG. 4 is a graph illustrating a verification of servo address marks using time events according to an example embodiment.

In reference now to FIG. 4, a graph 400 illustrates an example of how time events can be used as part of servo mark validation as described herein. Axis 401 indicates increasing time, and marks 402-405 represent theoretical times when servo patterns are expected to begin. As with any real-world system, some variation may be expected in the detection of these patterns, as indicated by distributions 406-409. Signal 410 shows events 411-414 that correspond to servo mark detection (e.g., SAM bits detected with less than Ls bit errors, where Ls may equal zero), but may still be subject to verification (e.g., validation at step 318 in FIG. 3). As indicated by dashed lines 416-419, the start time of these events may or may not fall within distributions 406-409, e.g., within a predefined confidence interval. Thus, event 413 may be discarded as a false alarm, while the other events 411, 412, and 414 may correspond to actual SAM data of servo sectors.

Generally, a system, method and apparatus in accordance with embodiments of the invention may check preamble bits (and/or other adjacent bits) only if there is/are bit error(s) in the servo mark that satisfy a threshold. For example, SAM detection/processing may be performed by default if there are no bit errors in SAM. This facilitates detecting SAM even if there is/are bit error(s) in SAM, yet exhibits fewer false alarms compared to, e.g., a system that allows one-bit tolerance in the SAM portion alone. False alarms rate may be lowered because preamble bits only have to be found to declare SAM if there is an error in the SAM. Otherwise SAM is found if all SAM bits are valid, even when the preamble is bad. Timestamp information can be used after SAM detection to check for false alarms in any of the above methods. Timestamps can be used inside the channel to aid in SAM detection and reduce false alarms. This may provide, if desired, a very tight SAM window based on timestamp in addition to the regular SAM window.

The above-described conditional detection of extended servo marks may be implemented in any combination of circuitry, firmware, and/or software using tools available to one of ordinary skill in the art. For example, in reference again to FIG. 1, a functional module 124 may be incorporated into servo controller 116, or otherwise included within logic circuit 102. This module 124 may perform, either alone or in combination with other operational modules, the conditional extended servo mark detection described herein, e.g., procedure such as is shown in FIG. 3.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   reading data from an address mark;
   detecting an error in the read address mark; and
   when an error is detected from the read address mark, continuing to use the read data in combination with at least one adjacent bit to the read address mark to overcome the detected error, the at least one adjacent bit being part of either gray code or a preamble.

2. The method of claim 1, wherein the at least one bit is directly adjacent to the address mark.

3. The method of claim 1, wherein the error comprises a threshold number of erroneous bits occurring in any combination of the address mark and at least one adjacent bit to the address mark.

4. The method of claim 1, further comprising:
   reading a timestamp to verify the address mark; and
   discarding the address mark if the timestamp falls outside a threshold value.

5. An apparatus comprising: a circuit configured to: detect an error in a servo address mark; and use an extended servo address mark word including the servo address mark and an adjacent bit from one of either a preamble or gray code, when an error is detected from a servo mark.

6. The apparatus of claim 5, further comprising:
   a disk having the servo address mark, preamble, and gray code.

7. The apparatus of claim 5, wherein the circuit is further configured to overcome the error using the extended servo address mark.

8. The apparatus of claim 5, wherein the error comprises a threshold number of erroneous bits occurring in any combination of the servo address mark and at least one adjacent bit to the servo address mark.

9. The apparatus of claim 5, wherein the circuit is further configured to: read a timestamp to verify the servo address mark; and discard the servo mark if the timestamp falls outside a threshold value.

10. A method comprising:
    during a data access operation, detecting a servo address mark associated with a disk drive track; and
    in response to an error in detecting the servo address mark, evaluating at least one adjacent bit together with the servo address mark to overcome the error, wherein the at least one adjacent bit comprises part of one of a gray code and a preamble.

11. The method of claim 10, further comprising:
    reading a timestamp to verify the detected servo address mark; and
    discarding the detected servo address mark if the timestamp falls outside a threshold value.

12. The method of claim 10, wherein overcoming the error comprises overcoming a threshold number of erroneous bits in any combination of the servo address mark and the at least one adjacent bit.

13. The method of claim 1, wherein a length of the read address mark is 9-bits long.

14. The method of claim 1, wherein the detecting step comprises:
   detecting an error when a single-bit error occurs.

15. The method of claim 1, wherein the read address mark is the only address mark read to overcome the detected error.

16. The method of claim 10, wherein the evaluating step includes evaluating two bits together with the servo address mark, wherein one of the two bits is part of the gray code and the other bit is part of the preamble.

17. The method of claim 10, wherein the servo address mark is the only servo address mark evaluated to overcome the detected error.

18. The apparatus of claim 6, wherein the bit is directly adjacent to the servo address mark.

* * * * *